United States Patent [19]

Asada

[11] Patent Number: 5,800,599
[45] Date of Patent: Sep. 1, 1998

[54] EMULSION INK FOR STENCIL PRINTING

[75] Inventor: Keisuke Asada, Miyagi-ken, Japan

[73] Assignee: Tohoku Ricoh Co., Ltd., Japan

[21] Appl. No.: 896,000

[22] Filed: Jul. 17, 1997

[30] Foreign Application Priority Data

Dec. 11, 1996 [JP] Japan ................... 8-351907

[51] Int. Cl.$^6$ ................... C09D 11/08; C09D 11/10
[52] U.S. Cl. ................... 106/31.26; 106/31.6; 106/31.73
[58] Field of Search ................... 106/31.26, 31.6, 106/31.73

[56] References Cited

U.S. PATENT DOCUMENTS

| | | | |
|---|---|---|---|
| 4,317,753 | 3/1982 | Tsuchiya et al. | 524/505 |
| 5,389,130 | 2/1995 | Batlaw et al. | 106/31.26 |
| 5,622,548 | 4/1997 | Zou et al. | 106/31.26 |
| 5,667,570 | 9/1997 | Okuda et al. | 106/31.26 |

*Primary Examiner*—Helene Klemanski

[57] ABSTRACT

A water-in-oil type emulsion ink for stencil printing, including an oil phase and an aqueous phase. The oil phase contains a pigment and a relatively high molecular weight resin having a weight average molecular weight of between 25,000 and 150,000.

8 Claims, No Drawings

EMULSION INK FOR STENCIL PRINTING

BACKGROUND OF THE INVENTION

This invention relates to an emulsion ink of a water-in-oil type useful for stencil printing.

In stencil printing, an ink is applied onto a perforated stencil master backed by a printing paper and is passed through the perforations to form an image on the printing paper. A water-in-oil (w/o) type emulsion ink is widely used for such a stencil printing method because of good drying property thereof. The w/o type emulsion ink includes an oil phase containing a pigment, and an aqueous phase which is in the form of fine droplets dispersed in the oil phase. Known w/o type emulsion ink, however, is not satisfactory because the ink printed on a surface of a paper is not firmly fixed to the paper and, therefore, is apt to be removed when rubbed with, for example, a finger.

For example, JP-A-6-293873 discloses a w/o type emulsion ink containing an alkyd resin and a chelating agent incorporated into the oil phase. While this ink shows good penetrability into a recording paper, the fixation of the ink on a surface of the paper is not satisfactory. JP-A-5-117564 discloses a w/o type emulsion ink containing a resin and a gelling agent. This ink has a drawback because the gelling agent is expensive and because the gelled resin has a high viscosity. JP-A-6-220382 proposes a w/o type emulsion ink containing a hydrophobic resin in the aqueous phase thereof. This ink has a drawback because the penetrability of the ink is not good and because the ink on a surface of a recording paper is sticky.

SUMMARY OF THE INVENTION

It is, therefore, an object of the present invention to provide a w/o type emulsion ink which is suited for stencil printing and which is excellent in fixation so that the ink printed on a surface of a paper is firmly fixed to the paper and is not easily removed when rubbed.

Another object of the present invention is to provide a w/o type emulsion ink in which a pigment is uniformly dispersed in the oil phase in a stable manner so that the printed image has uniform image density.

In accomplishing the foregoing object, there is provided in accordance with the present invention a water-in-oil type emulsion ink including an aqueous phase and an oil phase containing a pigment and a relatively high molecular weight resin having a weight average molecular weight of between 25,000 and 150,000.

Other objects, features and advantages of the present invention will become apparent from the detailed description of the preferred embodiments to follow.

DETAILED DESCRIPTION OF THE PREFERRED EMBODIMENTS OF THE INVENTION

In the w/o type emulsion ink according to the present invention, a relatively high molecular weight resin having a weight average molecular weight of between 25,000 and 150,000 is incorporated into the oil phase together with a pigment.

Although not wishing to be bound by the theory, the relatively high molecular weight resin, when the ink is dried, probably adsorbs the pigment molecules on the surfaces thereof. Since the resin is tightly bound to a recording paper, the fixation of the pigment to a surface of the recording paper is improved.

A weight average molecular weight of at least 25,000 is required for obtaining the improvement in fixation of the pigment. When a resin having a weight average molecular weight greater than 150,000 is used, however, the solubility of the resin in the oil phase is considerably reduced and, further, the viscosity of the ink becomes high.

Illustrative of suitable resins having a weight average molecular weight of between 25,000 and 150,000 are rosin; rosin derivatives such as polymerized rosin, hydrogenated rosin, esterified rosin, hydrogenated and esterified rosin; rosin-modified resins such as rosin-modified phenol resins; phenol resins; petroleum resins; alkyd resins; cyclized rubbers; and polymerized castor oil. Rosin-modified phenol resins such as TAMANOL 361, KG-836, KG-1808-1, KG-885, KG-1800, TAMANOL 370, TAMANOL 396, KG-801, KG-825, KG-8456, KG-1816 and TAMANOL G-5 (products of Arakawa Kagaku Kabushiki Kaisha) are particularly preferably used. The above high molecular weight resins may be used singly or in combination of two or more thereof.

The relatively high molecular weight resin is preferably used in an amount of at least 0.3 part by weight, more preferably 0.4–2 parts by weight, most preferably 0.5–1.5 parts by weight, per part by weight of the pigment. The relatively high molecular weight resin is preferably used in an amount of not greater than 50% by weight, more preferably 1–50% by weight, most preferably 2–24% by weight, based on the weight of the oil phase. Too high an amount of the resin in excess of 50% by weight is disadvantageous for reasons of economy and of increased viscosity of the oil phase.

The pigment incorporated into the oil phase together with the relatively high molecular weight resin may be, for example, carbon black, titanium oxide, an azo pigment, a phthalocyanin pigment, a nitroso pigment, a nitro pigment, a vat dye pigment, a mordant dye pigment, a basic dye pigment, an acidic dye pigment, a natural dye pigment and an oil-soluble dye (e.g. a diazo dye and an anthraquinone dye). These pigments and dyes may be used singly or in combination of two or more thereof.

Whilst it is essential that the above-described relatively high molecular weight resin should be present in the oil phase of the emulsion ink, the presence of a relatively low molecular weight resin having a molecular weight of less than 25,000 is not prohibited but, rather, is preferred. Probably, the relatively low molecular weight resin serves to function as a dispersant for the pigment and to prevent the pigment molecules to be aggregated.

The relatively low molecular weight resin may be, for example, rosin; rosin derivatives such as polymerized rosin, hydrogenated rosin, esterified rosin, hydrogenated and esterified rosin; rosin-modified resins such as rosin-modified phenol resins; phenol resins; petroleum resins; alkyd resins; cyclized rubbers; and polymerized castor oil.

Above all, the use of an alkyd resin is preferred. An alkyd resin has a main skeleton obtained by condensation of a polybasic acid and a polyhydric alcohol. The main skeleton is modified with a fat or oil to form the alkyd resin. Examples of the polybasic acids include phthalic anhydride, isophthalic acid, terephthalic acid, succinic acid, adipic acid, sebacic acid, tetrahydrophthalic acid, maleic acid, maleic anhydride, fumaric acid, itaconic acid and citraconic anhydride. Examples of polyhydric alcohols include ethylene glycol, diethylene glycol, triethylene glycol, polethylene glycol, propylene glycol, trimethylene glycol, tetramethylene glycol, glycerin, trimethylolpropane, neopentyl glycol, diglycerin, triglycerin, penthaerythritol, dipentaerythritol, mannitol and sorbitol. Examples of fats and oils include non-drying oil and semi-drying oil having an iodine value of 80 or less and fatty acids of these oils, such as coconut oil, palm oil, olive oil, castor oil, rice oil and cotton oil. Drying oil such as soybean oil, tung oil and linseed oil may also be used as long as the resulting alkyd resin has an iodine value of 80 or less.

The alkyd resin to be used as the relatively low molecular weight resin preferably has an oil length of 60–90 and a iodine value of 80 or less. The term "oil length" of the alkyd resin used herein is intended to refer to a percentage of the weight of the fatty acids contained in the fat and oil based on the weight of the alkyd resin when calculated in terms of triglycerides. The alkyd resin preferably has a molecular weight of 10,000 or less.

The amount of the relatively low molecular weight resin is preferably at least 0.05 part by weight, more preferably 0.1–2 parts by weight, most preferably 0.2–1 part by weight, per part by weight of the pigment. The total weight of the relatively high and relatively low molecular weight resins is preferably not greater than 50% by weight, more preferably 1–50% by weight, most preferably 2–30% by weight, based on the weight of the oil phase.

The oil phase generally contains a solvent and an emulsifier in addition to the pigment and the resin. A dispersing agent and an oxidization inhibitor may also be suitably incorporated into the oil phase.

The solvent may be, for example, a petroleum-derived solvent, liquid paraffin, spindle oil, light oil, kerosene oil, machine oil, lubricant oil, mineral oil and plant oil. Illustrative of suitable petroleum-derived solvents are ISOPER and EXXOL (both manufactured by Exxon Inc.), AF solvent (manufactured by Nippon Petroleum Inc.), SUNPER and SUNTHENE (both manufactured by Sun Petroleum Oil Inc.). Illustrative of suitable plant oils are tall oil, linseed oil, corn oil, olive oil, rapeseed oil, castor oil, dehydrated castor oil and soybean oil.

The emulsifier is preferably a nonionic surfactant such as higher fatty acid esters of sorbitan, higher fatty acid esters of polyoxyethylenesorbitan, monoglycerides of fatty acids, fatty acid esters of polyglycerin, diglycerides of fatty acids and ethylene oxide addition products of higher alcohols, alkylphenols and fatty acids. These surfactants may be used singly or in combination of two or more thereof having different HLB values. The emulsifier is used in an amount of 0.5–15% by weight, preferably 2–5.5% by weight, based on the weight of the ink.

The dispersing agent for the pigment may be, for example, alkylamines having a high molecular weight, aluminum chelate compounds, styrene-maleic anhydride copolymers, high molecular weight polycarboxylic acid esters, aliphatic polycarboxylic acids, amine salts of polyesters, ester-type anionic surfactants, long chain amine salts of high molecular weight polycarboxylic acids, salts of long chain polyaminoamides with polyesters, polyamides, phosphoric acid ester surfactants, salts of alkylsulfocarboxylic acids, salts of α-olefinsulfonic acids, and salts of dioctylsulfosuccinic acid. The above-described emulsifier may also be used as the dispersing agent. The dispersing agent is used in an amount of 40% by weight or less, preferably 2–35% by weight, based on the weight of the pigment.

The oxidation inhibitor may be, for example, dibutylhydroxytoluene, propyl gallate and butylhydroxyanisole and is generally used in an amount of 2 by weight or less, preferably 0.1–1% by weight, based on the weight of the solvent.

A wax may be incorporated into the oil phase, if desired. The wax serves to facilitate the separation of the printed paper from drums.

The aqueous phase generally contains water, an electrolyte, a mildew-proof agent (antiseptic agent), a water-soluble polymer and a hydrophobic polymer (in the form of an oil-in-water (o/w) type resin emulsion). An antifreezing agent and a pH controlling agent may also be suitably incorporated into the aqueous phase.

The electrolyte serves as an emulsion stabilizer. A salt providing an ion which is high in lyotropic series is preferably used. Examples of anions having high rank in lyotropic series include citrate ions, tartarate ions, sulfate ions and acetate ions, while examples of such cations include alkali metal ion and alkaline earth metal ions. Thus, a salt capable of providing at least one of the above anions and cations is preferably used as the electrolyte. Illustrative of suitable electrolytes are magnesium sulfate, sodium sulfate, sodium citrate, sodium hydrogenphosphate, sodium borate and sodium acetate. These electrolytes may be used singly or in combination of two or more thereof. The electrolyte is generally used in an amount of 0.1–2% by weight, preferably 0.5–1.5% by weight, based on the weight of the aqueous phase.

The water-soluble polymer serves as a viscosity controlling agent as well as a wetting agent for the prevention of drying of the aqueous phase. Both natural and synthetic polymers may be used. Examples of water-soluble natural polymers include starch, mannan, sodium alginate, galactan, tragacanth rubber, gum Arabic, pullulan, dextran, xanthan rubber, gelatin, collagen, casein and glue. Examples of water-soluble synthetic polymers include carboxymethyl cellulose, methyl cellulose, hydroxyethyl cellulose, hydroxymethyl starch, carboxymethyl starch, dialdehyde-type starch, acrylic resins, sodium salt of polyacrylic acid, polyvinyl alcohol, polyvinyl pyrrolidone, polyacrylamide, poly-N-alkylsubstituted acrylamide, poly-N,N-dialkylsubstituted acrylamide, polyethylene oxide and polyvinyl methyl ether. Acrylamide polymers and acrylic polymers may be of a partly hydrophobic copolymer-type in which alkyl groups are incorporated into part of the monomer units or in which the acrylamide polymer and acrylic polymer are block-copolymerized with polyethylene, polypropylene or polybutylene. The above water-soluble polymers may be used singly or in combination with two or more thereof. The amount of the water-soluble polymer is generally 25% by weight or less, preferably 0.5–15% by weight, based on the weight of the water contained in the ink.

The hydrophobic polymer which is used in the form of o/w type emulsion serves to improve drying property of the stencil ink. The polymer may be, for example, polyvinyl acetate, polyvinyl chloride, polyacrylate, polymethacrylate, ethylene-vinyl acetate copolymer, vinyl acetate-acrylic ester copolymer, styrene-acrylic ester copolymer, vinylidene chloride-acrylic ester copolymer, vinyl chloride-vinyl acetate copolymer and urethane. The o/w type emulsion may be prepared in any known emulsifying method using a suitable dispersing agent, a protective colloid or a surfactant. Soap-free emulsion polymerization may also produce the o/w type emulsion. The o/w type emulsion is used in such an amount that the hydrophobic polymer is present in an amount of 2–50% by weight, preferably 3–20% by weight, based on the weight of the aqueous phase.

The mildew-proof agent is used for the prevention of growth of molds or germs in the ink during storage. Illustrative of suitable mildew-proof/antiseptic agent are salicylic acid, phenol compounds, p-oxybenzoate compounds such as methyl p-oxybenzoate and ethyl p-oxybenzoate, chlorinated p-oxybenzoate compounds, sorbic acid and dehydroacetic acid. These compounds may be used singly or in combination of two or more thereof. The mildewproof agent is generally used in an amount of not greater than 3% by weight, preferably 0.1–1.2% by weight, based on the weight of the water in the ink.

The antifreezing agent which may also serve as a wetting agent may be, for example, glycols such as ethylene glycol, diethylene glycol and propylene glycol, lower alcohols such as methanol, ethanol, isopropanol, butanol and isobutanol, and polyhydric alcohols such as glycerin and sorbitol. The amount of the antifreezing agent is generally not greater than 15% by weight, preferably 4–12% by weight, based on the weight of the water in the ink.

The pH controlling agent is used to maintain the pH of the ink at a suitable range of, for example, 6–8. Triethanol amine, triamylamine and sodium acetate are examples of the pH controlling agent.

If desired, other additives such as a preservative for the prevention of rust and an anti-foaming agent may be incorporated into the aqueous phase.

The w/o type emulsion ink according to the present invention may be prepared by any known method.

The following examples will further illustrate the present invention. Parts are by weight.

EXAMPLE 1

A pigment, a dispersing agent and a solvent as shown below are mixed and kneaded with three rolls. The resulting dispersion was mixed with a vanish containing an emulsifier, a solvent, a relatively low molecular weight resin and a relatively high molecular weight resin as shown below to obtain an oil phase. An aqueous phase containing water, an antifreezing agent and an electrolyte as shown below was gradually added to the oil phase using an emulsifying device to obtain a w/o type emulsion ink having the composition shown below. The alkyd resin used as the relatively low molecular weight resin had a weight average molecular weight (MW) of less than 10,000 and an iodine value of less than 10 and was obtained from 76 parts of coconut oil, 7 parts of pentaerythritol and 17 parts of isophthalic acid.

| Pigment; carbon black | 4 parts |
| --- | --- |
| Solvent; spindle oil | 9.7 parts |
| AF-6 Solvent (manufactured by Nippon petroleum oil Inc.) | 6 parts |
| Dispersing agent; aluminum chelate | 0.3 part |
| Relatively low molecular weight resin; alkyd resin | 4 parts |
| Relatively high molecular weight resin; rosin-modified phenol resin (Mw: 40,000) | 2 parts |
| Emulsifier (sorbitan sesquioleate) | 4 parts |
| Water; deionized water | 59 parts |
| Antifreezing agent; ethylene glycol | 10 parts |
| Electrolyte; magnesium sulfate | 1 part |

EXAMPLE 2

A w/o type emulsion ink having the composition shown below was prepared in the same manner as described in Example 1.

| Pigment; phthalocyanin blue | 4 parts |
| --- | --- |
| Solvent; spindle oil | 6 parts |
| AF-5 Solvent (manufactured by Nippon petroleum oil Inc.) | 9 parts |
| Dispersing agent; aluminum chelate | 2 parts |
| Relatively high molecular weight resin; rosin-modified phenol resin (MW: 80,000) | 4 parts |
| Emulsifier (sorbitan sesquioleate) | 5 parts |
| Water; deionized water | 59 parts |
| Antifreezing agent; ethylene glycol | 10 parts |
| Electrolyte; magnesium sulfate | 1 part |

EXAMPLE 3

A w/o type emulsion ink having the composition shown below was prepared in the same manner as described in Example 1.

| Pigment; carbon black | 3 parts |
| --- | --- |
| Solvent; spindle oil | 7.7 parts |
| AF-6 Solvent (manufactured by Nippon petroleum oil Inc.) | 10.5 parts |
| Dispersing agent; aluminum chelate | 0.3 part |
| Relatively low molecular weight resin; alkyd resin | 1 part |
| Relatively high molecular weight resin; rosin-modified phenol resin (Mw: 30,000) | 5 parts |
| Emulsifier (sorbitan sesquioleate) | 4 parts |
| Water; deionized water | 57.5 parts |
| Antifreezing agent; ethylene glycol | 10 parts |
| Electrolyte; magnesium sulfate | 1 part |

EXAMPLE 4

A w/o type emulsion ink having the composition shown below was prepared in the same manner as described in Example 1.

| Pigment; phthalocyanin blue | 4 parts |
| --- | --- |
| Solvent; spindle oil | 6 parts |
| AF-7 Solvent (manufactured by Nippon petroleum oil Inc.) | 8 parts |
| Dispersing agent; aluminum chelate | 2 parts |
| Relatively low molecular weight resin; alkyd resin | 1 part |
| Relatively high molecular weight resin; rosin-modified phenol resin (MW: 80,000) | 4 parts |
| Emulsifier (sorbitan sesquioleate) | 5 parts |
| Water; deionized water | 59 parts |
| Antifreezing agent; ethylene glycol | 10 parts |
| Electrolyte; magnesium sulfate | 1 part |

EXAMPLE 5

A w/o type emulsion ink having the composition shown below was prepared in the same manner as described in Example 1.

| Pigment; phthalocyanin blue | 4 parts |
| --- | --- |
| Solvent; spindle oil | 6 parts |
| AF-5 Solvent (manufactured by Nippon petroleum oil Inc.) | 8.9 parts |
| Dispersing agent; aluminum chelate | 2 parts |
| Relatively low molecular weight resin; alkyd resin | 0.1 part |
| Relatively high molecular weight resin; rosin-modified phenol resin (MW: 80,000) | 4 parts |
| Emulsifier (sorbitan sesquioleate) | 5 parts |
| Water; deionized water | 59 parts |
| Antifreezing agent; ethylene glycol | 10 parts |
| Electrolyte; magnesium sulfate | 1 part |

EXAMPLE 6

A w/o type emulsion ink having the composition shown below was prepared in the same manner as described in Example 1.

| Pigment; phthalocyanin blue | 4 parts |
| --- | --- |
| Solvent; spindle oil | 6.7 parts |
| AF-7 Solvent (manufactured by Nippon petroleum oil Inc.) | 8 parts |
| Dispersing agent; aluminum chelate | 2 parts |

-continued

| | |
|---|---|
| Relatively low molecular weight resin; alkyd resin | 0.3 part |
| Relatively high molecular weight resin; rosin-modified phenol resin (Mw: 80,000) | 4 parts |
| Emulsifier (sorbitan sesquioleate) | 5 parts |
| Water; deionized water | 59 parts |
| Antifreezing agent; ethylene glycol | 10 parts |
| Electrolyte; magnesium sulfate | 1 part |

EXAMPLE 7

A w/o type emulsion ink having the composition shown below was prepared in the same manner as described in Example 1.

| | |
|---|---|
| Pigment; phthalocyanin blue | 3 parts |
| Solvent; spindle oil | 7.5 parts |
| AF-7 Solvent (manufactured by Nippon petroleum oil Inc.) | 8 parts |
| Dispersing agent; aluminum chelate | 1.5 parts |
| Relatively low molecular weight resin; rosin-modified phenol resin (Mw: 10,000) | 3 parts |
| alkyd resin | 1 part |
| Relatively high molecular weight resin; rosin-modified phenol resin (MW: 80,000) | 1 part |
| Emulsifier (sorbitan sesquioleate) | 5 parts |
| Water; deionized water | 59 parts |
| Antifreezing agent; ethylene glycol | 10 parts |
| Electrolyte; magnesium sulfate | 1 part |

EXAMPLE 8

A w/o type emulsion ink having the composition shown below was prepared in the same manner as described in Example 1.

| | |
|---|---|
| Pigment; phthalocyanin blue | 4 parts |
| Solvent; spindle oil | 6 parts |
| AF-5 Solvent (manufactured by Nippon petroleum oil Inc.) | 8 parts |
| Dispersing agent; aluminum chelate | 2 parts |
| Relatively low molecular weight resin; rosin-modified phenol resin (MW: 10,000) | 2 parts |
| alkyd resin | 1 part |
| Relatively high molecular weight resin; rosin-modified phenol resin (MW: 80,000) | 2 parts |
| Emulsifier (sorbitan sesquioleate) | 5 parts |
| Water; deionized water | 59 parts |
| Antifreezing agent; ethylene glycol | 10 parts |
| Electrolyte; magnesium sulfate | 1 part |

EXAMPLE 9

A w/o type emulsion ink having the composition shown below was prepared in the same manner as described in Example 1.

| | |
|---|---|
| Pigment; phthalocyanin blue | 4 parts |
| Solvent; spindle oil | 7 parts |
| AF-6 Solvent (manufactured by Nippon petroleum oil Inc.) | 8 parts |
| Dispersing agent; aluminum chelate | 2 parts |
| Relatively low molecular weight resin; alkyd resin | 1 part |
| Relatively high molecular weight resin; rosin-modified phenol resin (MW: 80,000) | 1 parts |
| Emulsifier (sorbitan sesquioleate) | 5 parts |
| Water; deionized water | 61 parts |
| Antifreezing agent; ethylene glycol | 10 parts |
| Electrolyte; magnesium sulfate | 1 part |

EXAMPLE 10

A w/o type emulsion ink having the composition shown below was prepared in the same manner as described in Example 1.

| | |
|---|---|
| Pigment; carbon black | 3 parts |
| Solvent; spindle oil | 3 parts |
| AF-6 Solvent (manufactured by Nippon petroleum oil Inc.) | 16 parts |
| Dispersing agent; aluminum chelate | 0.5 part |
| Relatively low molecular weight resin; alkyd resin | 1 part |
| Relatively high molecular weight resin; rosin-modified phenol resin (MW: 40,000) | 10 parts |
| Emulsifier (sorbitan sesquioleate) | 3 parts |
| Water; deionized water | 52.5 parts |
| Antifreezing agent; ethylene glycol | 10 parts |
| Electrolyte; magnesium sulfate | 1 part |

EXAMPLE 11

A w/o type emulsion ink having the composition shown below was prepared in the same manner as described in Example 1.

| | |
|---|---|
| Pigment; carbon black | 3.5 parts |
| solvent; spindle oil | 7.7 parts |
| AF-7 Solvent (manufactured by Nippon petroleum oil Inc.) | 9 parts |
| Dispersing agent; aluminum chelate | 0.3 part |
| Relatively low molecular weight resin; alkyd resin | 1 part |
| Relatively high molecular weight resin; rosin-modified phenol resin (MW: 60,000) | 6 parts |
| Emulsifier (sorbitan sesquioleate) | 4 parts |
| Water; deionized water | 57.5 parts |
| Antifreezing agent; ethylene glycol | 10 parts |
| Electrolyte; magnesium sulfate | 1 part |

EXAMPLE 12

A w/o type emulsion ink having the composition shown below was prepared in the same manner as described in Example 1.

| | |
|---|---|
| Pigment; phthalocyanin blue | 4 parts |
| Solvent; spindle oil | 6 parts |
| AF-4 Solvent (manufactured by Nippon petroleum oil Inc. | 8 parts |
| Dispersing agent; aluminum chelate | 2 parts |
| Relatively low molecular weight resin; alkyd resin | 1 part |
| Relatively high molecular weight resin; rosin-modified phenol resin (MW: 150,000) | 4 parts |
| Emulsifier (sorbitan sesquioleate) | 5 parts |
| Water; deionized water | 59 parts |

| | |
|---|---|
| Antifreezing agent; ethylene glycol | 10 parts |
| Electrolyte; magnesium sulfate | 1 part |

EXAMPLE 13

A w/o type emulsion ink having the composition shown below was prepared in the same manner as described in Example 1.

| | |
|---|---|
| Pigment; carbon black | 4 parts |
| Solvent; spindle oil | 7.5 parts |
| AF-5 Solvent (manufactured by Nippon petroleum oil Inc.) | 8.9 parts |
| Dispersing agent; aluminum chelate | 0.5 part |
| Relatively low molecular weight resin; rosin-modified phenol resin (MW: 10,000) | 0.1 part |
| Relatively high molecular weight resin; rosin-modified phenol resin (MW: 40,000) | 4 parts |
| Emulsifier (sorbitan sesquioleate) | 5 parts |
| Water; deionized water | 59 parts |
| Antifreezing agent; ethylene glycol | 10 parts |
| Electrolyte; magnesium sulfate | 1 part |

EXAMPLE 14

A w/o type emulsion ink having the composition shown below was prepared in the same manner as described in Example 1.

| | |
|---|---|
| Pigment; carbon black | 4 parts |
| Solvent; spindle oil | 8.2 parts |
| AF-7 Solvent (manufactured by Nippon petroleum oil inc.) | 8 parts |
| Dispersing agent; aluminum chelate | 0.5 part |
| Relatively low molecular weight resin; rosin-modified phenol resin (MW: 10,000) | 0.3 part |
| Relatively high molecular weight resin; rosin-modified phenol resin (MW: 40,000) | 4 parts |
| Emulsifier (sorbitan sesquioleate) | 5 parts |
| Water; deionized water | 59 parts |
| Antifreezing agent; ethylene glycol | 10 parts |
| Electrolyte; magnesium sulfate | 1 part |

EXAMPLE 15

A w/o type emulsion ink having the composition shown below was prepared in the same manner as described in Example 1.

| | |
|---|---|
| Pigment; carbon black | 3 parts |
| Solvent; spindle oil | 2.7 parts |
| AF-4 Solvent (manufactured by Nippon petroleum oil Inc.) | 12 parts |
| Dispersing agent; aluminum chelate | 0.3 part |
| Relatively low molecular weight resin; alkyd resin | 14 parts |
| Relatively high molecular weight resin; rosin-modified phenol resin (MW: 40,000) | 4 parts |
| Emulsifier (sorbitan sesquioleate) | 4 parts |
| Water; deionized water | 49.5 parts |
| Antifreezing agent; ethylene glycol | 10 parts |
| Electrolyte; magnesium sulfate | 0.5 part |

COMPARATIVE EXAMPLE 1

A w/o type emulsion ink having the composition shown below was prepared in the same manner as described in Example 1.

| | |
|---|---|
| Pigment; phthalocyanin blue | 4 parts |
| Solvent; spindle oil | 7 parts |
| AF-6 Solvent (manufactured by Nippon petroleum oil Inc.) | 8 parts |
| Dispersing agent; aluminum chelate | 2 parts |
| Relatively low molecular weight resin; rosin-modified phenol resin (MW: 10,000) | 4 parts |
| Emulsifier (sorbitan sesquioleate) | 5 parts |
| Water; deionized water | 59 parts |
| Antifreezing agent; ethylene glycol | 10 parts |
| Electrolyte; magnesium sulfate | 1 part |

COMPARATIVE EXAMPLE 2

A w/o type emulsion ink having the composition shown below was prepared in the same manner as described in Example 1.

| | |
|---|---|
| Pigment; carbon black | 4 parts |
| Solvent; spindle oil | 5.5 parts |
| AF-4 Solvent (manufactured by Nippon petroleum oil Inc.) | 2 parts |
| SUNTHENE 407 (manufactured by Sun Petroleum Inc.) | 14 parts |
| Dispersing agent; aluminum chelate | 0.5 part |
| high molecular weight resin; rosin-modified phenol resin (MW: 200,000) | 4 parts |
| Emulsifier (sorbitan sesquioleate) | 5 parts |
| Water; deionized water | 54 parts |
| Antifreezing agent; ethylene glycol | 10 parts |
| Electrolyte; magnesium sulfate | 1 part |

COMPARATIVE EXAMPLE 3

A w/o type emulsion ink having the composition shown below was prepared in the same manner as described in Example 1.

| | |
|---|---|
| Pigment; phthalocyanin blue | 4 parts |
| Solvent; spindle oil | 6 parts |
| AF-5 Solvent (manufactured by Nippon petroleum oil Inc.) | 8 parts |
| Dispersing agent; aluminum chelate | 2 parts |
| Relatively low molecular weight resin; rosin ester (MW: 10,000) | 4 parts |
| alkyd resin | 1 part |
| Emulsifier (sorbitan sesquioleate) | 5 parts |
| Water; deionized water | 59 parts |
| Antifreezing agent; ethylene glycol | 10 parts |
| Electrolyte; magnesium sulfate | 1 part |

Each of the above w/o type emulsion inks was tested for the fixation and aggregation of the pigment according to the following method. The results are summarized in Table 1.

Ink sample is charged in a commercially available stencil printer (VT3500 manufactured by Ricoh Company, Ltd.) and the printing is repeatedly carried out. The printed paper obtained in the 10th printing operation is subjected to the following tests:

FIXATION

A dry cloth is attached to a crock meter. The crock meter is operated so that the printed paper is rubbed with the cloth for 10 reciprocation (for 10 seconds). The cloth is then observed to evaluate the degree of foul caused by transfer of the ink from the printed paper to the cloth. Evaluation is rated as follows:

A: no foul (excellent)
B: slight foul (good)
C: moderate foul (no good)
D: significant foul (poor)
E: considerable foul (very poor)

AGGREGATION

The printed image is observed with a microscope to evaluate the formation of aggregates of pigments. Aggregates are formed when the pigment is not uniformly dispersed in the oil phase of the ink. Evaluation is rated as follows:

A: no aggregation (excellent)
B: slight aggregation (good)
C: moderate aggregation (no good)
D: significant aggregation (poor)
E: considerable aggregation (very poor)

TABLE 1

| Example No. | Ratio of High MW Resin to Pigment *1 | Ratio of Low MW Resin to Pigment *2 | Fixation | Aggregation |
|---|---|---|---|---|
| 1 | 0.50 | 1.00 | A | A |
| 2 | 1.00 | 0 | B | C |
| 3 | 1.67 | 0.33 | A | A |
| 4 | 1.00 | 0.25 | A | A |
| 5 | 1.00 | 0.03 | B | B |
| 6 | 1.00 | 0.08 | A | A |
| 7 | 0.33 | 1.33 | A | A |
| 8 | 0.50 | 0.75 | A | A |
| 9 | 0.25 | 0.25 | B | A |
| 10 | 3.33 | 0.33 | A | A |
| 11 | 1.71 | 0.29 | A | A |
| 12 | 1.00 | 0.25 | A | A |
| 13 | 1.00 | 0.03 | B | B |
| 14 | 1.00 | 0.08 | A | A |
| 15 | 1.33 | 4.67 | A | A |
| Comp. 1 | 0 | 1.00 | E | A |
| Comp. 2 | 0 | 0 | E | E |
| Comp. 3 | 0 | 1.25 | E | A |

*1: Weight ratio of the relatively high molecular weight resin having a weight average molecular weight of 25,000 to 150,000 to the pigment.
*2: Weight ratio of the relatively low molecular weight resin having a weight average molecular weight of less than 25,000 to the pigment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A water-in-oil emulsion ink comprising an oil phase and an aqueous phase, said oil phase comprising a pigment and a relatively high molecular weight resin having a weight average molecular weight of between 25,000 and 150,000.

2. A water-in-oil emulsion ink as claimed in claim 1, wherein said relatively high molecular weight resin is present in an amount of at least 0.3 part by weight per part by weight of said pigment and in an amount of 50% or less based on the weight of said oil phase.

3. A water-in-oil emulsion ink as claimed in claim 1, wherein said oil phase further comprises a relatively low molecular weight resin having a weight average molecular weight of less than 25,000.

4. A water-in-oil emulsion ink as claimed in claim 3, wherein said relatively low molecular weight resin is an alkyd resin.

5. A water-in-oil emulsion ink as claimed in claim 3, wherein said relatively low molecular weight resin is present in an amount of at least 0.05 part by weight per part by weight of said pigment, and wherein the total amount of said relatively high and relatively low molecular weight resins is 50% or less based on the weight of said oil phase.

6. A water-in-oil emulsion ink as claimed in claim 2, wherein said oil phase further comprises a relatively low molecular weight resin having a weight average molecular weight of less than 25,000.

7. A water-in-oil emulsion ink as claimed in claim 6, wherein said relatively low molecular weight resin is an alkyd resin.

8. A water-in-oil emulsion ink as claimed in claim 6, wherein said relatively low molecular weight resin is present in an amount of at least 0.05 part by weight per part by weight of said pigment, and wherein the total amount of said relatively high and relatively low molecular weight resins is 50% or less based on the weight of said oil phase.

* * * * *

UNITED STATES PATENT AND TRADEMARK OFFICE
CERTIFICATE OF CORRECTION

PATENT NO. : 5,800,599
DATED : September 1, 1998
INVENTOR(S) : ASADA et al

It is certified that error appears in the above-indentified patent and that said Letters Patent is hereby corrected as shown below:

Col. 3, line 54, "2 by" should read --2% by--.

Col. 7, line 15, after "in", second instance, insert --Example 1--

Signed and Sealed this

Twenty-seventh Day of July, 1999

Attest:

Q. TODD DICKINSON

*Attesting Officer*  *Acting Commissioner of Patents and Trademarks*